United States Patent
Bangalore et al.

(10) Patent No.: US 7,966,174 B1
(45) Date of Patent: *Jun. 21, 2011

(54) AUTOMATIC CLUSTERING OF TOKENS FROM A CORPUS FOR GRAMMAR ACQUISITION

(75) Inventors: Srinivas Bangalore, Morristown, NJ (US); Giuseppe Riccardi, Hoboken, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 548 days.

This patent is subject to a terminal disclaimer.

(21) Appl. No.: 12/030,935

(22) Filed: Feb. 14, 2008

Related U.S. Application Data

(63) Continuation of application No. 10/662,730, filed on Sep. 15, 2003, now Pat. No. 7,356,462, which is a continuation of application No. 09/912,461, filed on Jul. 26, 2001, now Pat. No. 6,751,584, which is a continuation of application No. 09/207,326, filed on Dec. 7, 1998, now Pat. No. 6,317,707.

(51) Int. Cl.
*G06F 17/27* (2006.01)

(52) U.S. Cl. .................. 704/9; 704/1; 704/10; 704/231; 704/245

(58) Field of Classification Search .................. 704/1, 9, 704/10, 231, 245
See application file for complete search history.

(56) References Cited

U.S. PATENT DOCUMENTS

| | | |
|---|---|---|
| 5,128,865 A | 7/1992 | Sadler |
| 5,195,167 A | 3/1993 | Bahl et al. |
| 5,325,298 A | 6/1994 | Gallant et al. |
| 5,619,709 A | 4/1997 | Caid et al. |
| 5,835,893 A | 11/1998 | Ushioda |
| 5,839,106 A | 11/1998 | Bellegarda |
| 5,860,063 A | 1/1999 | Gorin et al. |
| 6,014,647 A | 1/2000 | Nizzari et al. |
| 6,052,657 A | 4/2000 | Yamro et al. |
| 6,073,091 A | 6/2000 | Kanevsky et al. |
| 6,094,653 A | 7/2000 | Li et al. |
| 6,178,396 B1 | 1/2001 | Ushioda |
| 6,182,091 B1 | 1/2001 | Pitkow et al. |
| 6,470,383 B1 | 10/2002 | Leshem et al. |
| 6,816,830 B1 | 11/2004 | Kempe |

OTHER PUBLICATIONS

"Dimensions of Meaning," Hinrich Schutze, Center for the Study of Language and Information, Ventura Hall. Proceedings of the 1992 ACM/IEEE conference on Supercomputing, Minneapolis, Minnesota. 1992.

"Grammar Fragment Acquisition using Syntactic and Semantic Clustering," Jeremy H. Wright, Giuseppe Riccardi, Allen L. Gorin AT&T Laboratories-Research, 180 Park Ave., Florham Park, NJ 07932, USA, & Kazuhiro Arai NTT Human Interface Laboratories, 1-1 Hikari-no-oka, Yokosuka, Kanagawa 239-0847, Japan. Received Oct. 14, 1997, revised Jul. 16, 1998, accepted Sep. 2, 1998, available online Feb. 17, 1999.

(Continued)

*Primary Examiner* — David R Hudspeth
*Assistant Examiner* — Lamont M Spooner

(57) ABSTRACT

A system for recognizing patterns is disclosed. Grammar learning from a corpus includes, for the other non-context words, generating frequency vectors for each non-context token in a corpus based upon counted occurrences of a predetermined relationship of the non-context tokens to identified context tokens. Clusters are grown from the frequency vectors according to a lexical correlation or a cluster tree among the non-context tokens. The cluster tree is used for pattern recognition.

12 Claims, 2 Drawing Sheets

OTHER PUBLICATIONS

"Improved Clustering Techniques for Class-Based Statistical Language Modeling," Reinhard Kneser and Hermann Ney. Philips GmbH Forschungslboratorien, Aachen, Germany. Eurospeech '93 Third European Conference on Speech Communication and Technology, Berlin, Germany. Sep. 22-25, 1993.

"Aggregate and Mixed Order Markov Models for Statistical Language Processing," Lawrence Saul and Fernando Pereira. AT&T Labs Research, 180 Park Ave, D-130, Florham Park, NJ 07932. 1997.

"Empirical Acquisition of Word and Phrase Classes in the Atis Domain," Michael K. McCandless and James R. Glass, EUROSPEECH '93 Third European Conference on Speech Communication and Technology, Berlin, Germany, Sep. 22-25, 1993.

"Distributional Clustering of English Words," Fernando Pereira, AT&T Bell Laboratories; Naftali Tishby, Hebrew University; and Lillian Lee, Cornell University. Apr. 25, 1993.

"Automatic Acquisition of Phrase Grammars for Stochastic Language Modeling," Giuseppe Riccardi and Srinivas Bangalore. AT&T Labs-Research, 180 Park Avenue, Florham Park, NJ 09732. 1998.

AUTOMATIC CLUSTERING OF TOKENS FROM A CORPUS FOR GRAMMAR ACQUISITION

PRIORITY APPLICATION

The present application is a continuation of U.S. patent application Ser. No. 10/662,730, filed Sep. 15, 2003, which is a continuation of U.S. patent application Ser. No. 09/912,461, filed Jul. 26, 2001, now U.S. Pat. No. 6,751,584, which is a continuation of Ser. No. 09/207,326, filed Dec. 7, 1998, now U.S. Pat. No. 6,317,707. This application is related to U.S. Patent Applicant Ser. No. 10/260,294, filed Oct. 1, 2002. The contents of each of these applications is incorporated herein by reference in their entirety.

BACKGROUND

The present invention relates to an application that builds linguistic models from a corpus of speech.

For a machine to comprehend speech, not only must the machine identify spoken (or typed) words, but it also must understand language grammar to comprehend the meaning of commands. Accordingly, much research has been devoted to the construction of language models that a machine may use to ascribe meaning to spoken commands. Often, language models are preprogrammed. However, such predefined models increase the costs of a speech recognition system. Also, the language models obtained therefrom have narrow applications. Unless a programmer predefines the language model to recognize a certain command, the speech recognition system that uses the model may not recognize the command. What is needed is a training system that automatically extracts grammatical relationships from a predefined corpus of speech.

SUMMARY

An embodiment of the present invention provides a system of learning grammar from a corpus, in which context words are identified from a corpus. For the other non-context words, the system counts the occurrence of predetermined relationships with the context words, and maps the counted occurrences to a multidimensional frequency space. Clusters are grown from the frequency vectors. The clusters represent classes of words; words in the same cluster possess the same lexical significance and provide an indicator of grammatical structure.

Another embodiment of the invention provides a system that recognizes patterns, the system includes a module configured to generate frequency vectors for each non-context token in a corpus based upon counted occurrences of a predetermined relationship of the non-context tokens to the context token, a module configured to cluster the non-context tokens into a cluster tree based upon the frequency vectors according to a lexical correlation among the non-context tokens, and a module configured to use the cluster tree for pattern recognition.

DETAILED DESCRIPTION

Embodiments of the present invention provide a system that automatically builds a grammatical model from a corpus of speech. As would be known in the art, such "systems" generally include basic components of computers or computing devices. These components include, memory, input/output capabilities, a display capability, a bus for communicating between various components of the system, and so forth. As is inherent throughout this disclosure, a "system" that performs the method disclosed herein would include such basic, known hardware components that are controlled by a computer program stored in a machine-readable medium. The present invention uses clustering to group words and/or phrases according to their lexical significance. Relationships between high frequency words called Acontext words@ and other input words are identified. The words to be clustered are each represented as a feature vector constructed from the identified relationships. Similarities between two input words are measured in terms of the distance between their feature vectors. Using these distances, input words are clustered according to a hierarchy. The hierarchy is then cut at a certain depth to produce clusters which are then ranked by a "goodness" metric. Those clusters that remain identify words or tokens from the corpus that possess similar grammatical significance.

Clustering per se is known. In the context of language modeling, clustering has typically been used on words to induce classes that are then used to predict smoothed probabilities of occurrence for rare or unseen events in the training corpus. Most clustering schemes use the average entropy reduction to decide when two words fall into the same cluster. Prior use of clustering, however, does not provide insight into language model of grammar.

Figure 1:
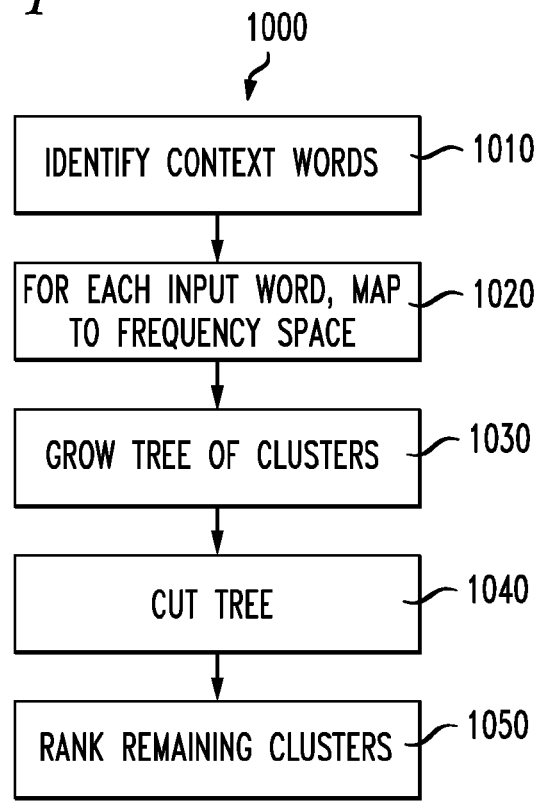
FIG. 1 is a flow diagram of a method of an embodiment of the present invention.

FIG. 1 illustrates a method of the present invention according to a first embodiment. The method operates upon input text, a set of words from which the grammar model shall be constructed. Typically, the input text comprises a set of single words or phonemes. From the input text, the method identifies context words (Step 1010). Context words are those words or phonemes in the input text that occur with the highest frequency. The method 1000 may cause a predetermined number of words (say, 50) that occur with the highest frequency to be identified as context words.

The method 1000 determines relationships that may exist between the context words and the remaining words, called "input words" herein, in the input text. For example, the method 1000 may determine how many times and in which positions an input word appears adjacent to a context word. Table 1 below illustrates relationships that may exist between certain exemplary input words and exemplary context words.

TABLE 1

| Input Word | Context Word | | | | | | | | | | | |
|---|---|---|---|---|---|---|---|---|---|---|---|---|
| | to | | | | from | | | | in | | | |
| | −2 | −1 | 1 | 2 | −2 | −1 | 1 | 2 | −2 | −1 | 1 | 2 |
| Chicago | $f_{111}$ | $f_{112}$ | $f_{113}$ | $f_{114}$ | $f_{121}$ | $f_{122}$ | $f_{123}$ | $f_{124}$ | $f_{131}$ | $f_{132}$ | $f_{133}$ | $f_{134}$ |
| New York | $f_{211}$ | $f_{212}$ | $f_{213}$ | $f_{214}$ | $f_{221}$ | $f_{222}$ | $f_{223}$ | $f_{224}$ | $f_{231}$ | $f_{232}$ | $f_{233}$ | $f_{234}$ |
| Baltimore | $f_{311}$ | $f_{312}$ | $f_{313}$ | $f_{314}$ | $f_{321}$ | $f_{322}$ | $f_{323}$ | $f_{324}$ | $f_{331}$ | $f_{332}$ | $f_{333}$ | $f_{334}$ |
| red | $f_{411}$ | $f_{412}$ | $f_{413}$ | $f_{414}$ | $f_{421}$ | $f_{422}$ | $f_{423}$ | $f_{424}$ | $f_{431}$ | $f_{432}$ | $f_{433}$ | $f_{434}$ |
| white | $f_{511}$ | $f_{512}$ | $f_{513}$ | $f_{514}$ | $f_{521}$ | $f_{522}$ | $f_{523}$ | $f_{524}$ | $f_{531}$ | $f_{532}$ | $f_{533}$ | $f_{534}$ |
| blue | $f_{611}$ | $f_{612}$ | $f_{613}$ | $f_{614}$ | $f_{621}$ | $f_{622}$ | $f_{623}$ | $f_{624}$ | $f_{631}$ | $f_{632}$ | $f_{633}$ | $f_{634}$ |

Each entry of the table, $f_{ijk}$ represents, for a given input word i; how many times a context word C; and non-context word i; appears within a predetermined relationship. Thus, $f_{111}$-$F_{114}$ each represent the number of times the input word "Chicago" and the context word "to" appear within adjacencies of −2 words, −1 word, +1 word and +2 words respectively.

Figure 2:
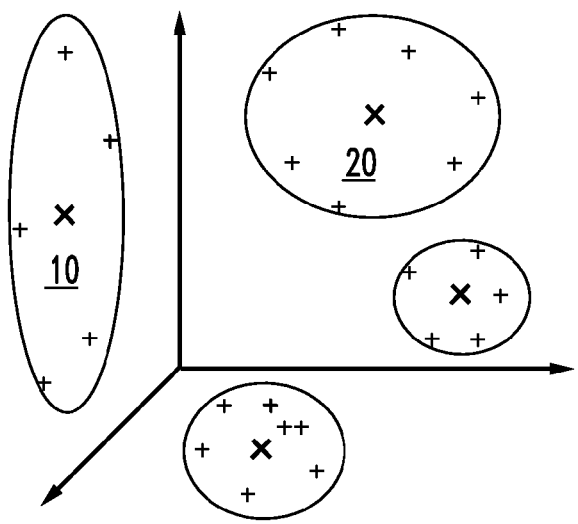
FIG. 2 illustrates mapping frequency vectors that may be obtained during operation of the present invention.

Based upon the frequencies, an N dimensional vector may be built for each input word (step 1020). The number of dimensions N of the frequency vector is a multiple of the total number of context words, the total number of input words and the total number of relations identified by the method 1000. The vector represents grammatical links that exist between the input words and the context words. Thus, each input word maps to an N dimensional frequency space. A representative frequency space is shown in FIG. 2 (N=3).

The method 1000 builds clusters of input words (Step 1030). According to the principles of the present invention, input words having the same lexical significance should possess similar vectors in the frequency space. Thus, it is expected that city names will exhibit frequency characteristics that are similar to each other but different from other input words having a different lexical significance. They will be included in a cluster (say, cluster 10, FIG. 2). So, too, with colors. They will be included in another cluster (say, cluster 20). Where words exhibit similar frequency significance, they are included within a single cluster.

As is known, a cluster may be represented in an N-dimensional frequency space by a centroid coordinate and a radius indicating the volume of the cluster. The radius indicates the "compactness" of the elements within a cluster. Where a cluster has a small radius, it indicates that the elements therein exhibit a very close relationship to each other in the frequency space. A larger radius indicates fewer similarities between elements in the frequency space.

The similarity between two words may be measured using the Manhattan distance metric between their feature vectors. Manhattan distance is based on the sum of the absolute value of the differences among the vector=s coordinates. Alternatively, Euclidean and maximum metrics may be used to measure distances. Experimentally, the Manhattan distance metric was shown to provide better results than the Euclidean or maximum distance metrics.

Step 1030 may be applied recursively to grow clusters from clusters. That is, when two clusters are located close to one another in the N dimensional space, the method 1000 may enclose them in a single cluster having its own centroid and radius. The method 1000 determines a distance between two clusters by determining the distance between their centroids using one of the metrics discussed above with respect to the vectors of input words. Thus, the Manhattan, Euclidean and maximum distance metrics may be used.

Figure 3:
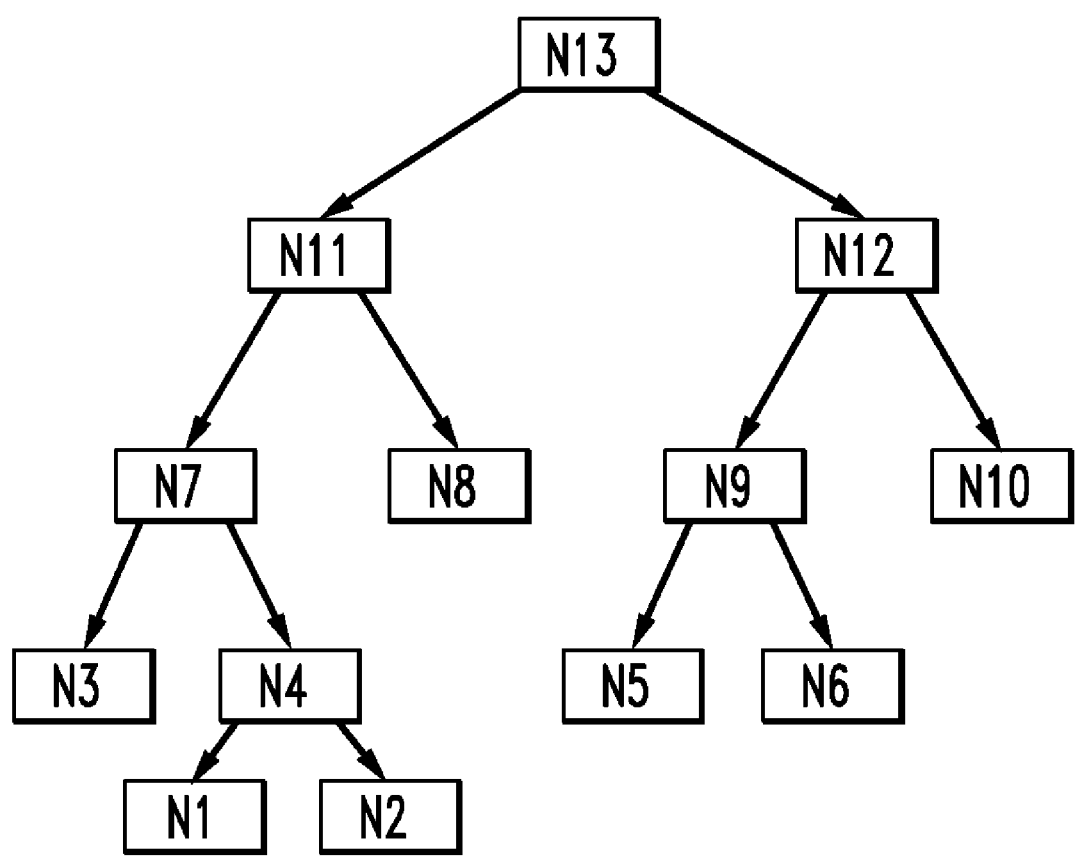
FIG. 3 illustrates an exemplary cluster tree.

A hierarchical "cluster tree" is grown representing a hierarchy of the clusters. At one node in the tree, the centroid and radius of a first cluster is stored. Two branches extend from the node to other nodes where the centroids and radii of subsumed clusters are stored. Thus, the tree structure maintains the centroid and radius of every cluster built according to Step 1030. Step 1030 recurs until a single, all encompassing cluster encloses all clusters and input words. This cluster is termed the "root cluster" because it is stored as the root node of the cluster tree. An exemplary cluster tree is shown in FIG. 3.

As will be appreciated, the root cluster N13 has a radius large enough to enclose all clusters and input words. The root cluster, therefore, possesses very little lexical significance. By contrast, "leaf clusters," those provided at the ends of branches in the cluster tree, possess very strong lexical significance.

At Step 1040, the method 1000 cuts the cluster tree along a predetermined line in the tree structure. The cutting line separates large clusters from smaller clusters. The large clusters are discarded. What remains are smaller clusters, those with greater lexical significance.

The cutting line determines the number of clusters that will remain. One may use the median of the distances between clusters merged at the successive stages as a basis for the cutting line and prune the cluster tree at the point where cluster distances exceed this median value. Clusters are defined by the structure of the tree above the cutoff point.

Finally, the method 1000 ranks the remaining clusters (Step 1050). The lexical significance of a particular cluster is measured by its compactness value. The compactness value of a cluster simply may be its radius or an average distance of the members of the cluster from the centroid of the cluster. Thus, the tighter clusters exhibiting greater lexical significance will occur first in the ranked list of clusters and those exhibiting lesser lexical significance will occur later in the list. The list of clusters obtained from Step 1050 is a grammatical model of the input text.

The method 1000 is general in that it can be used to cluster "tokens" at any lexical level. For example, it may be applied to words and/or phrases. Table 2 illustrates the result of clustering words and Table 3 illustrates the result of clustering phrases as performed on an experimental set of training data taken from the How May I Help You? Training corpus disclosed in Gorin, et al., "How May I Help You?," vol. 23, Speech Communication, pp. 113-127 (1997). Other lexical granularities (syllables, phonemes) also may be used.

TABLE 2

Results of Clustering Words from AT&T's How May I Help You? Corpus

| Class Index | Compactness Value | Class Members |
|---|---|---|
| C363 | 0.131 | make place |
| C118 | 0.18 | eight eighty five four nine oh one seven six three two zero |
| C357 | 0.19 | bill charge |
| C260 | 0.216 | an and because but so when |
| C300 | 0.233 | K O ok |
| C301 | 0.236 | From please |
| C277 | 0.241 | again here |
| C202 | 0.252 | as it's |
| C204 | 0.263 | different third |
| C77 | 0.268 | number numbers |
| C275 | 0.272 | Need needed want wanted |
| C256 | 0.274 | assistance directory information |
| C197 | 0.278 | all before happened |
| C68 | 0.278 | ninety sixty |
| C41 | 0.29 | his our the their |
| C199 | 0.291 | called dialed got have as by in no not now of or something that that's there whatever |
| C27 | 0.296 | working |
| C327 | 0.296 | I I'm I've canada england france germany israel italy japan london |
| C48 | 0.299 | mexico paris |
| C69 | 0.308 | back direct out through |
| C143 | 0.312 | connected going it arizona california carolina florida georgia illinois island jersey maryland michigan missouri ohio pennsylvania |
| C89 | 0.314 | virginia west york |
| C23 | 0.323 | be either go see somebody them |
| C90 | 0.332 | about me off some up you |

TABLE 3

Results from a First Iteration of Combining Phrase Acquisition and Clustering from the How May I Help You? Corpus (Words in a Phrase are Separated by a Colon).

| Class Index | Compactness Value | Class Members |
|---|---|---|
| D365 | 0.226 | wrong:C77 second |
| D325 | 0.232 | C256:C256 C256 |
| D380 | 0.239 | area:code:C118:C118:C118:C118:C118 C68 |
| D386 | 0.243 | A:C77 this:C77 |
| D382 | 0.276 | C260:C357:C143:to:another C260:C357:C143:to:my:home |
| D288 | 0.281 | C327:C275:to:C363 I'd:like:toC363 to:363 yes:I'd:like:to:C363 |
| D186 | 0.288 | good:morning yes:ma'am yes:operator hello hi ma'am may well |
| D148 | 0.315 | problems trouble |
| D87 | 0.315 | A:T:C260:T C260:C327 C27:C27 C41:C77 C118 C143 C260 C197 C199 C202 C23 C260 C27 C277 C301 C69 C77 C90 operator to |
| D183 | 0.321 | C118:C118:hundred C204 telephone |
| D143 | 0.326 | new:C89 C48 C89 colorado massachusetts tennessee texas |
| D387 | 0.327 | my:home my:home:phone |
| D4 | 0.336 | my:calling my:calling:card my:card |
| D70 | 0.338 | C199:a:wrong:C77 misdialed |
| D383 | 0.341 | like:to:C363 trying:to:C363 would:like:to:C363 |
| D381 | 0.347 | like:to:C363:a:collect:call:to like:to:C363:collect:call would:like:to:C363:a:collect:call would:like:to:C363:a:collect:call would:like:to:C363:a:collect:call:to |
| D159 | 0.347 | C118:C118 C118:C118:C118 C118:C118:C118:C118:C118 C118:C118:C118:C118:C118:C118 C118:C118:C118:C118:C118:C118:C118:C118:C118:C118 C:118:C118:C118:C118:C118:C118:C118:C118:C118:C118 area:code:C118:C118:C118 C300 |

Adjacency of words is but one relationship that the method 1000 may be applied to recognize from a corpus. More generally, however, the method 1000 may be used to recognize predetermined relationships among tokens of the corpus. For example, the method 1000 can be configured to recognize words that appear together in the same sentences or words that appear within predetermined positional relationships with punctuation. Taken even further, the method 1000 may be configured to recognize predetermined grammatical constructs of language, such as subjects and/or objects of verbs. Each of these latter examples of relationships may require that the method be pre-configured to recognize the grammatical constructs.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A system that recognizes patterns, the system comprising:
    a first module configured to control a processor to generate frequency vectors for each non-context token in a corpus based upon counted occurrences of a predetermined relationship of the non-context tokens to context tokens;
    a second module configured to control the processor to cluster the non-context tokens into a cluster tree based upon the frequency vectors according to a lexical correlation among the non-context tokens; and
    a third module configured to control the processor to use the cluster tree for pattern recognition.

2. A system that performs grammar learning from a corpus, the system comprising:
    a first module configured to control a processor to generate frequency vectors for each non-context token in a corpus based upon counted occurrences of a predetermined relationship of the non-context tokens to context tokens;
    a second module configured to control the processor to cluster the non-context tokens based upon the frequency vectors according to a lexical correlation among the non-context tokens; and
    a third module configured to control the processor to use a cluster tree for pattern recognition.

3. The system of claim 2, wherein the second module configured to control the processor to cluster is further configured to control the processor to cluster the non-context tokens into a cluster tree.

4. The system of claim 3, wherein the cluster tree represents a grammatical relationship among the non-context tokens.

5. The system of claim 3, further comprising a fourth module configured to control the processor to cut the cluster tree along a cutting line to separate large clusters from small clusters.

6. The system of claim 2, wherein small clusters are ranked according to a compactness value.

7. The system of claim 2, wherein the predetermined relationship is a measure of adjacency.

8. The system of claim 2, wherein the second module configured to control the processor to cluster performs the clustering based on Euclidean distances between the frequency vectors.

9. The system of claim 2, wherein the second module configured to control the processor to cluster performs the clustering based on Manhattan distances between the frequency vectors.

10. The system of claim 2, wherein the second module configured to cluster performs the clustering based on maximum distance metrics between the frequency vectors.

11. The system of claim 2, further comprising a fourth module configured to control the processor to normalize the frequency vectors based upon a number of occurrences of the non-context token in the corpus.

12. The system of claim 2, wherein the frequency vectors are multi-dimensional vectors, the number of dimensions being determined by the number of context tokens and a number of predetermined relationships of non-context tokens to the context token being counted.

* * * * *